Dec. 13, 1960  D. M. HARVEY  2,964,255
TENSION BALANCING SYSTEM FOR A PHOTOGRAPHIC RECORDING APPARATUS
Filed Sept. 9, 1958  3 Sheets-Sheet 1

Donald M. Harvey
INVENTOR.
BY R. Frank Smith
Steve W. Grembow
ATTORNEYS

Donald M. Harvey
INVENTOR.

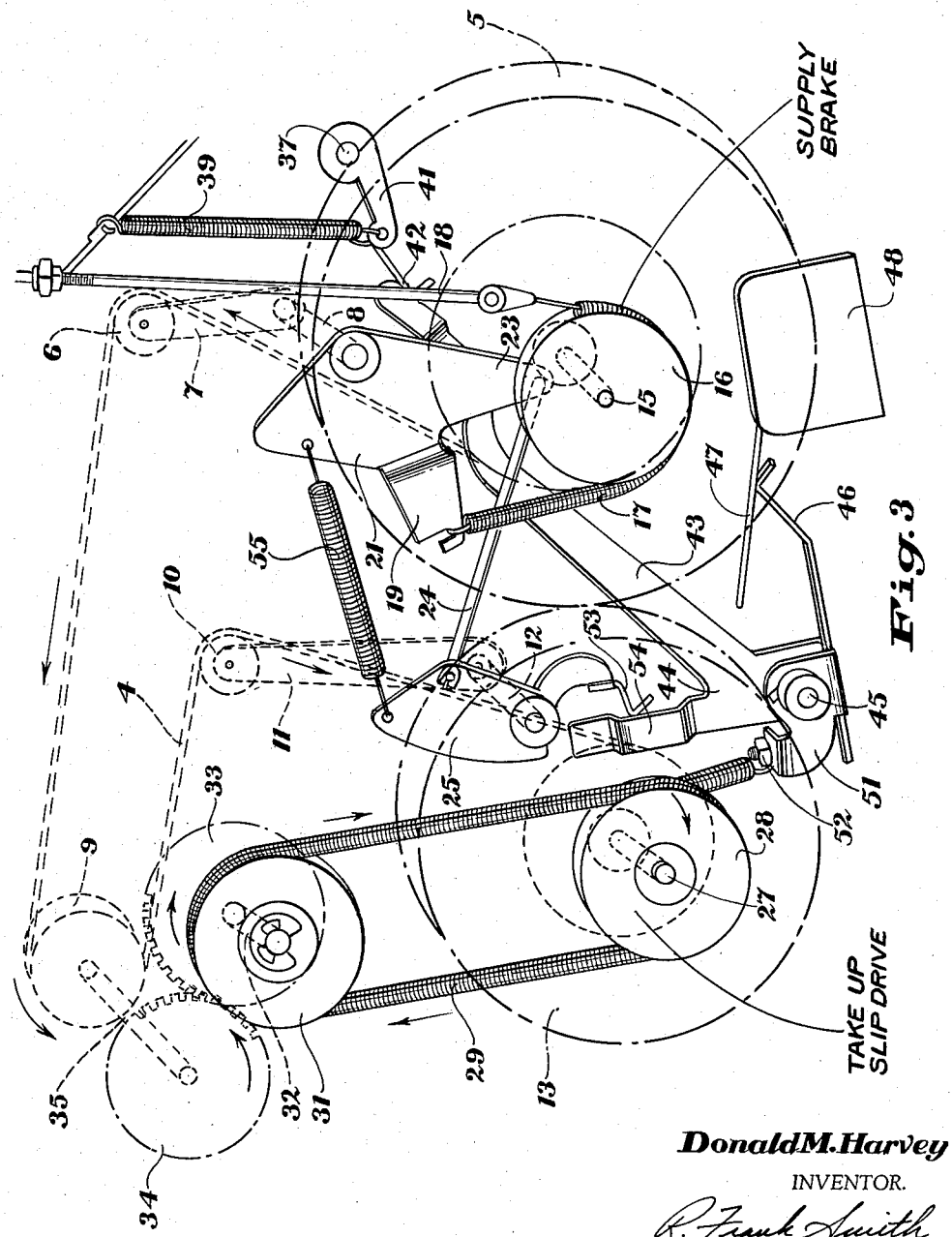

United States Patent Office 2,964,255
Patented Dec. 13, 1960

2,964,255

TENSION BALANCING SYSTEM FOR A PHOTOGRAPHIC RECORDING APPARATUS

Donald M. Harvey, Rochester, N.Y., assignor to Eastman Kodak Company, Rochester, N.Y., a corporation of New Jersey Filed Sept. 9, 1958, Ser. No. 759,957

14 Claims. (Cl. 242—55.11)

This invention relates generally to a photographic recording apparatus, and more specifically to a film tension balancing mechanism adapted to maintain substantially equal film tensions before and after the friction drive roller of a copying apparatus.

As is well known in continuous photographic recording machines, a document to be recorded is continuously moved through an exposure station where the document is illuminated and the reflected image is directed by mirrors to the photographing station where the image is recorded on a continuously moving light-sensitive recording means. It is necessary in this type of document recording apparatus that the movement of the recording means, which is normally a filmstrip, be in synchronism with the movement of the document image. This is sometimes difficult to achieve since the filmstrips are not provided with apertures and accordingly cannot be positively driven by a sprocket. Instead, the filmstrip is advanced by a rubberized friction roller which has in most instances at least 180° of its periphery in contact with the filmstrip in an effort to increase the friction existing therebetween and to reduce or minimize any slippage. Even then, film slippage between the filmstrip and drive roller sometimes occurs destroying the synchronized relationship existing between the filmstrip and the document image. In order to eliminate this slippage, some of the manufacturers have adopted a pressure roller spring-biased against the friction roller and between which the filmstrip is fed. However, the introduction of the pressure roller is objectionable because the roller presses against the emulsion layer of the filmstrip causing pressure desensitization thereof, and a marring of the emulsion layer resulting from emulsion particles adhering to the pressure roller and being pulled away therefrom. Another system adopted by the industry to eliminate the slippage utilizes a spring-biased roller acting on the filmstrip before it reaches the friction roller and a similar spring-biased roller acting on the filmstrip after it leaves the friction roller. Although this system has been helpful in reduction slippage, it has not eliminated it.

In light of the great need in the industry for some means for overcoming this objectionable slippage, applicant's have devised a mechanism that essentially eliminates such slippage by maintaining the tension of the portion of a filmstrip between the friction drive roller and supply reel substantially equal to the tension of the portion of the filmstrip between the drive roller and the take-up reel. As a result, there is little tendency for the filmstrip to slide over the friction roller which often occurs if the tension of one portion of the filmstrip is greater than the tension in the other portion. As is well known, the tension of the portion of the filmstrip being wound on the take-up reel constantly varies as the roll diameter changes thereby developing a tension that in certain instances is considerably greater or less than the tension of the portion of the filmstrip between the friction roller and the supply reel. This mechanism will be described in detail hereinafter.

One of the primary objects of this invention, therefore, is to provide an improved film-tensioning mechanism for a photographic recording apparatus that eliminates slippage between the filmstrip and friction drive roller thereby assuring that the filmstrip and the document image are moved in synchronism, and also eliminates other disadvantages of prior art devices.

Another object of this invention is the provision of a film-tensioning mechanism that maintains substantially equal tensions of the filmstrip before and after the friction drive roller.

A further object of this invention is the provision of a film-tensioning mechanism for a photographic recording apparatus that is of simple design and construction, thoroughly reliable and efficient in operation and economical to manufacture.

Objects and advantages other than those set forth above will be apparent from the following description when read in connection with the accompanying drawing, in which:

Fig. 3 is a perspective view of the copying apparatus with the support wall dividing the two sides omitted for purposes of clarity, and showing (in dotted and broken lines) the structure that normally appears behind the wall.

Figure 1:
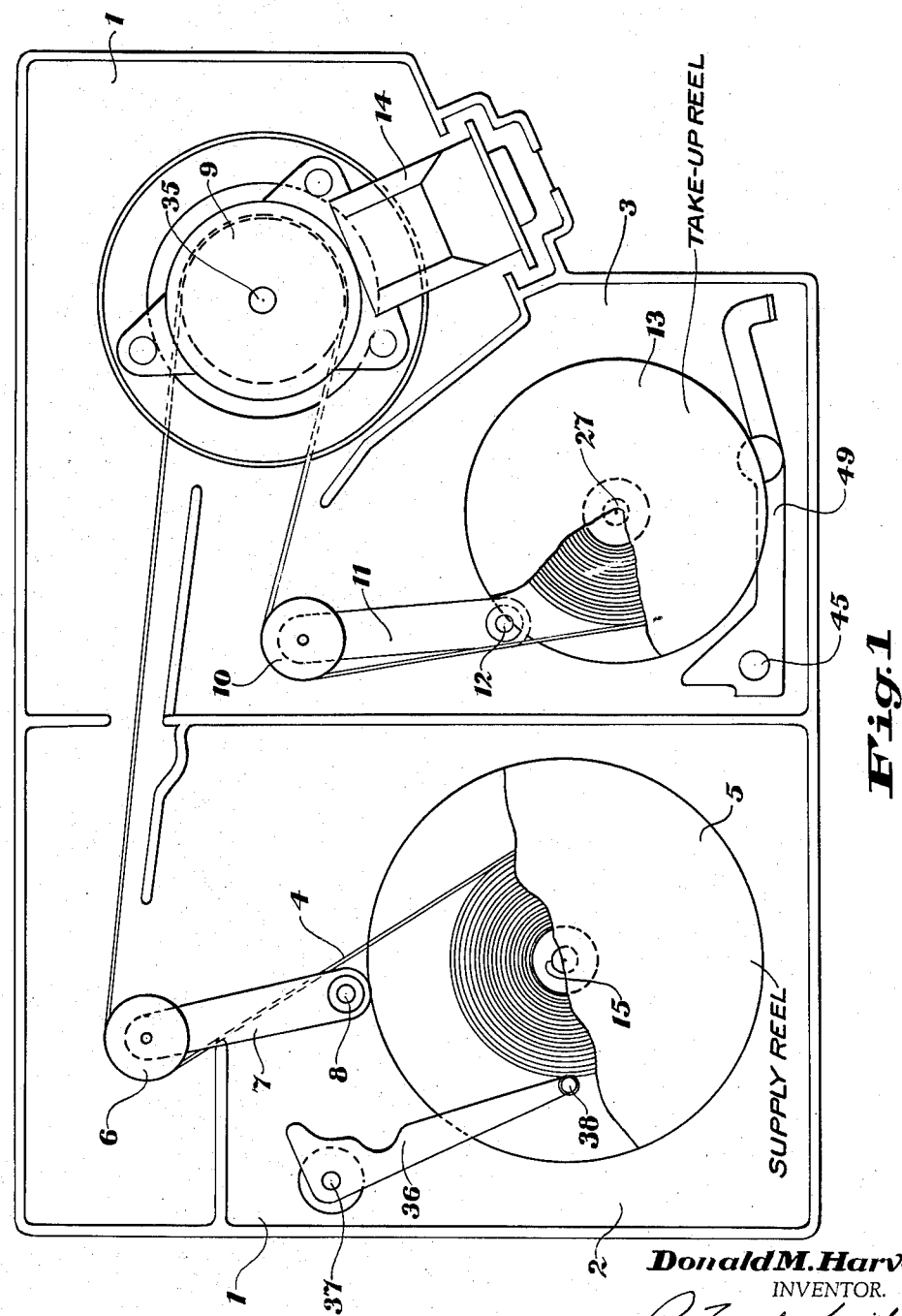
Fig. 1 is a side elevation view of a copying apparatus embodying the invention.

As shown in the drawings, a preferred embodiment of this invention is illustrated as applied to a document recording apparatus. As is well known in the art, document-recording apparatus of this type generally includes a photographing station, a feeding means for moving documents through the photographing station, an exposure station, an advancing means for moving a filmstrip through the exposure station in synchronism with the movement of the document, and an electromagnetic clutch which connects the advancing means to the feeding means upon actuation of control members in the document path as shown and described in U.S. Patent No. 2,403,711 issued July 9, 1946 to J. F. Egan.

Figure 2:
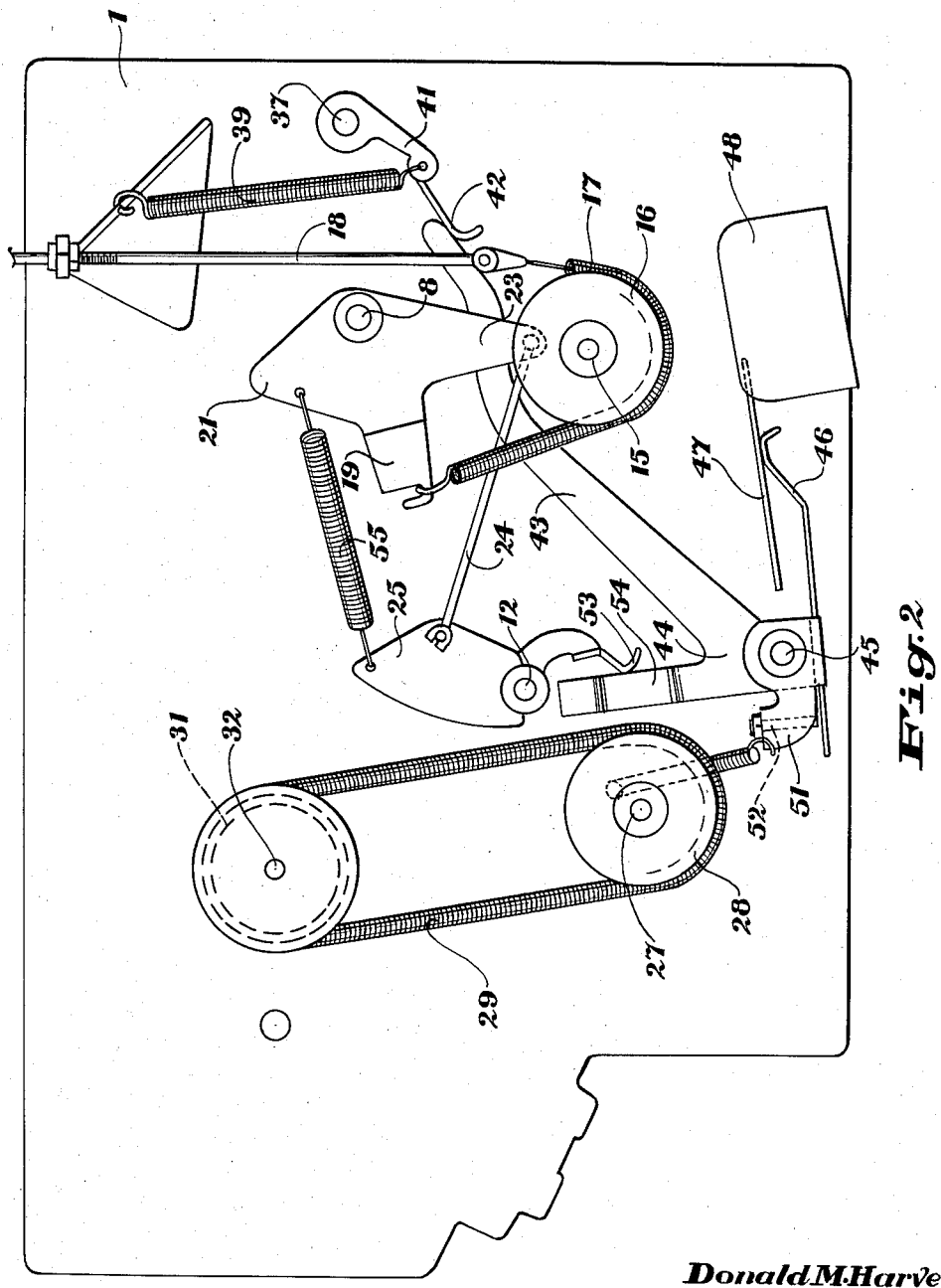
Fig. 2 is a side elevation view of the opposite side of the copying apparatus of Fig. 1.

The document-recording apparatus is shown in Figs. 1 and 2 as having a common support wall 1 for supporting a portion of the film advancing means on one side as seen in Fig. 1, and a film tensioning mechanism on the other side as seen in Fig. 2. The film advancing means includes film supply and film take-up compartments 2, 3 respectively formed by the support wall 1. The path of the film extends from the film supply reel 5 over a float roller 6 rotatably mounted on an arm 7 which is keyed to a rotatable shaft 8. The film passes around a friction drive roller 9, over another float roller 10 rotatably mounted on an arm 11 which is keyed to a rotatable shaft 12, and thence onto the takeup reel 13. A lens mount 14 of the exposure station is mounted adjacent the film 4 and has objectives, not shown, for directing an image of a document onto the film. As indicated earlier, suitable mechanism such as disclosed in the Egan patent is provided for moving the film 4 in synchronism with movement of the document image.

In a document-recording apparatus of the type disclosed, the tension of the film being wound upon the take-up reel 13 tends to vary primarily due to change in roll diameter and decreases as the roll diameter increases. This occurs because the torque transmitted to the take-up reel 13 through a spring belt 29 is essentially constant, and accordingly the film tension varies inversely with respect to the film roll radius. The tension of the film 4 leaving the supply reel 5 also varies primarily in accordance with the roll diameter and increases as the roll diameter decreases. Accordingly, the film tension before and after the friction drive roller is substantially equal only when the film supply and take-up roll diameters are equal. Since this occurs only once during operation of the recording apparatus, during the remaining time the film tensions vary inversely with respect to the roll diameters. Accordingly, during the beginning or the end of a recording operation, that is when the supply roll diameter is the largest and the take-up roll diameter the smallest or vice versa, the greatest film tension differential exists on the film before and after the friction drive roller. It is readily appreciated that any film tension differential existing between the portion of the film 4 from the drive roller 9 to the take-up reel 13 and the portion of the film from the drive roller 9 to the supply reel 5 may cause the film to slide over the periphery of the friction drive roller 9. By maintaining the film tensions of the portions substantially equal before and after the friction drive roller 9 throughout operation of the recording apparatus, the tendency for the film 4 to slip on the roller 9 is eliminated. The elimination of such slippage is extremely important in a document recording apparatus of this type since any such slippage destroys the synchronism between the film 4 and document image causing the images of two succeeding documents to overlap on the film partially obliterating a portion of each.

In a preferred embodiment, the apparatus for maintaining substantially equal film tensions before and after the friction drive roller 9 is the film-tensioning mechanism shown in Fig. 2. This mechanism comprises a shaft 15 on one end of which the supply reel 5 is mounted and on the other end of which is mounted a pulley 16 connected to a braking device. The braking device comprises a spring 17 having one end connected to the frame through a spring tension adjusting rod 18, and the opposite end connected to an arm 19 formed by a bell crank member 21 fixedly mounted on the other end of shaft 8. Another arm 23 forming a part of the bell crank member 21 is connected by a rod 24 to a lever 25 fixed on the other end of shaft 12.

A shaft 27 upon one end of which the take-up reel 13 is mounted is provided at its other end with a take-up slip drive comprising a pulley 28 drivingly connected by the spring belt 29 to a pulley 31 mounted on one end of a shaft 32 carried by the support wall 1 as seen in Fig. 3. A gear 33 is mounted on the opposite end of the shaft 32 and is drivingly connected to another gear 34 mounted on a shaft 35 which supports the friction drive roller 9. A drive motor, not shown, of the film advancing means is drivingly connected to shaft 35 for driving the friction drive roller 9 and the take-up reel 13.

In the operation of this invention, the friction drive roller 9 and take-up reel 13 are driven by the drive motor for advancing the film 4 and winding it onto the take-up reel 13. The action of the take-up reel 13 and the diameter of the film wound thereon establishes a tension in the film 4 which is sensed by the take-up float roller 10. Since the tension of the film 4 being wound upon the take-up reel 13 tends to vary as a result of vibration, change to roll diameter, etc. the float roller 10 and shaft 12 tends to pivot about the axis of shaft 12 in response thereto. Such movement of the float roller 10 and shaft 12 causes the lever 25 to pivot therealong. The movement of lever 25 is transmitted by virtue of the rod 24 to the bell crank 21 actuating the spring brake 17. Assuming initially that the tension of the portion of the film from the drive roller 9 to the take-up reel 13 increases, the increased film tension causes the float roller 10 and shaft 12 to move in a counterclockwise direction as seen in Fig. 3. Such movement of the float roller 10 and shaft 12 causes the lever 25 to move in the same direction and by virtue of connecting rod 24 the bellcrank 21 is moved in a clockwise direction causing the spring brake 17 to apply a braking force upon the pulley 16. Also because of the connection between bell crank 21 and shaft 8, supply float roller 6 is also moved in a clockwise direction at this time. Both of these actions tend to increase the tension of the portion of the film from the drive roller 9 to the supply reel 5 until it is substantially equal to the tension of the portion of the film from the drive roller 9 to the take-up reel 13. Should this tension for some unexpected reason, like a bent reel, exceed the tension of the portion of the film being wound on the take-up reel 13, the float roller 6 is moved counterclockwise as seen in Fig. 3 releasing the brake 17. Let us assume now that the tension of the portion of the film being wound on the take-up reel 13 decreases. The take-up float roller 10 and shaft 12 is pivoted about the axis of shaft 12 in a clockwise direction as seen in Fig. 3 causing the lever 25 to move in the same direction and the bellcrank 21 and shaft 8 by virtue of rod 24 to move in a counterclockwise direction. This causes the supply float roller 6 to pivot therealong and the bellcrank 21 to decrease the braking effect upon the pulley 16. As a result, the tension of the portion of the film leaving the supply reel 5 decreases to a value substantially equal to the tension of the portion of the film being wound on the take-up reel 13. It is clear from this that the tension of the film leaving the supply reel 5 and the tension of the film being wound on the take-up reel 13 are maintained substantially equal throughout the operation of the document-recording apparatus.

The recording apparatus is further provided with an alarm system adapted to indicate to the operator that the following conditions exist: (1) the supply reel is empty; (2) the take-up reel is full; and (3) the film is not being taken up on the take-up reel because of a film break or improper loading.

A footage supply lever 36 as seen in Fig. 1 is fixed to shaft 37 and has a roller 38 at one end biased by spring 39 as seen in Figs. 2 and 3 against the film convolutions of the supply reel 5. A lever 41 is mounted on the other end of the shaft 37 and has a finger 42 adapted to engage an arm 43 of lever 44 which pivots around a shaft 45. The lever 44 has an arm 46 adapted to engage a movable contact 47 of a micro-switch 48. When the supply reel becomes empty the levers 36 and 41 are moved counterclockwise as seen in Fig. 1 causing the finger 42 to pivot lever 44 causing its arm 46 to actuate the micro-switch 48 and sound an alarm, not shown.

A full take-up alarm lever 49 is secured to one end of shaft 45 as seen in Fig. 1, and a lever 51 secured to the opposite end as seen in Fig. 2. The lever 51 carries an adjustable stud 52 which is adapted to engage one end of arm 46. It is readily apparent that when the take-up reel 13 becomes full, the film convolutions urge the lever 49 and shaft 45 in a clockwise direction as seen in Fig. 1 causing the stud 52 to urge arm 46 in a counterclockwise direction until it actuates the micro-switch 48 and sounds the alarm.

The lever 25 is provided with a finger 53 as seen in Fig. 2 adapted to engage an arm 54 of lever 44. If the film is not being taken up on the take-up reel properly because of a film break or improper loading, slack will develop in that portion of the film strip engaged by float roller 10, and a spring 55 interconnecting levers 21 and 25 will move the lever 25 in a clockwise direction, looking at Fig. 3, causing the finger 53 to urge lever 44 in a counterclockwise direction about shaft 45 causing the arm 46 to actuate the micro-switch 48 and sound the alarm.

The invention has been described in detail with particular reference to preferred embodiments thereof, but it will be understood that variations and modifications can be effected within the spirit and scope of the invention as described hereinabove and as defined in the appended claims.

I claim:
1. In a web winding apparatus having a web supply reel, a driven take-up reel for receiving a web being wound from said supply reel onto said take-up reel, and a drive roller interposed between said reels and in frictional engagement with said web for transporting said web at a constant speed, said web further having a first web portion extending from said supply reel to said drive roller and a second web portion extending from said drive roller to said take-up reel, the combination comprising: first means including a movable member adapted to engage said first web portion, and whose position is changed in response only to a variation in tension in one of said web portions; second means including a movable member adapted to engage said second web portion, and whose position is changed in response only to a variation in tension in one of said web portions; third means for applying an adjustable braking force to said supply reel; and fourth means including a direct connection between said first and second means actuable by a change in position of the movable members of said first and second means for adjusting said braking force whereby the tensions in said first and second web portions are maintained substantially equal.

2. A web winding apparatus as defined in claim 1 wherein said movable member of said first and second means comprises a pivotally mounted member.

3. A web winding apparatus as defined in claim 1 wherein said third means comprises a spring cooperating with a pulley connected to said supply reel.

4. A web winding apparatus at defined in claim 1 wherein said fourth means comprises a rod connecting said first and second means.

5. A web winding apparatus as defined in claim 1 wherein each of said movable members of said first and second means comprises a respective pivotally mounted lever, said third means comprises a spring having one end connected to one of said levers, the opposite end fixed and the intermediate portion cooperating with a pulley connection to said supply reel, and said fourth means comprises a rod connecting said levers.

6. A web winding apparatus as defined in claim 5 wherein said rod connects said levers on opposite sides of their pivots whereby pivotal movement of one of said levers in one direction causes a corresponding pivotal movement of the other lever in the opposite direction.

7. A web winding apparatus as defined in claim 1 wherein a spring interconnects said first and second means for biasing said first and second means toward one another in the event the web breaks or slack develops therein resulting from the web not being properly taken up on the take-up reel.

8. In a web winding apparatus having a web supply reel, a driven tak-up reel for receiving a web being wound from said supply reel onto said take-up reel, and a drive roller interposed between said reels and in frictional engagement with said web for transporting said web at a constant speed, said web further having a first web portion extending from said supply reel to said drive roller and a second web portion extending from said drive roller to said take-up reel, the combination comprising: a first pivotally mounted member adapted to engage said first web portion and whose position is changed in response only to a change in tension in one of said web portions; a first lever connected to said first member and pivotally movable therewith; a pulley connected to said supply reel; a brake actuable by said first lever and associated with said pulley for applying an adjustable braking force to said supply reel; a second pivotally mounted member adapted to engage said second web portion and whose position is changed in response only to a change in tension in one of said web portions; a second lever connected to said second member and pivotally movable therewith; and means including a direct connection between said first and second levers actuable by a change in position of said first and second members for adjusting said braking force whereby the tensions in said first and second web portions are maintained substantially equal.

9. A web winding apparatus as defined in claim 8 wherein said first and second members are each provided with a roller at one end in engagement with said web.

10. A web winding apparatus as defined in claim 8 wherein said brake comprises a helical spring having one end connected to said first lever, the other end fixed and the intermediate portion cooperating with said pulley.

11. A web winding apparatus as defined in claim 8 wherein said means comprises a rod connecting said first and second levers.

12. A web winding apparatus as defined in claim 11 wherein said rod connects said levers on opposite sides of their pivots whereby pivotal movement of one of said levers in one direction causes a corresponding pivotal movement of the other lever in the opposite direction.

13. A web winding apparatus as defined in claim 8 wherein a spring interconnects said first and second levers ior biasing said first and second members toward one another in the event the web breaks or slack develops therein resulting from the web not being properly taken up on the take-up reel.

14. A web winding apparatus as defined in claim 8 wherein said first and second members are each provided with a roller at one end in engagement with said web; said brake comprises a helical spring having one end connected to said first lever; the other end fixed and the intermediate portion cooperating with said pulley; and said means comprises a rod connecting said first and second levers.

References Cited in the file of this patent

UNITED STATES PATENTS

| | | |
|---|---|---|
| 1,423,780 | Slinger | July 25, 1922 |
| 1,695,857 | Proctor | Dec. 18, 1928 |
| 1,944,022 | Bundick et al. | Jan. 16, 1934 |
| 2,349,018 | Tasker | May 16, 1944 |
| 2,855,160 | Fundingsland | Oct. 7, 1958 |

UNITED STATES PATENT OFFICE
CERTIFICATION OF CORRECTION

Patent No. 2,964,255                          December 13, 1960

Donald M. Harvey

It is hereby certified that error appears in the above numbered patent requiring correction and that the said Letters Patent should read as corrected below.

Column 1, line 54, for "reduction" read -- reducing --; column 3, line 61, for "to" read -- in --; column 5, line 31, for "at" read -- as --; line 40, for "connection" read -- connected --; same column 5, line 54, for "tak-up" read -- take-up --.

Signed and sealed this 30th day of May 1961.

(SEAL)
Attest:

ERNEST W. SWIDER
Attesting Officer

DAVID L. LADD
Commissioner of Patents